US012600381B2

(12) United States Patent (10) Patent No.: US 12,600,381 B2
Harris et al. (45) Date of Patent: Apr. 14, 2026

(54) VEHICLE OPERATION MODIFICATION BASED ON WEATHER SENSING SENSORS

(71) Applicants: Scott C Harris, San Diego, CA (US); Benjamin J Kwitek, Colorado Springs, CO (US)

(72) Inventors: Scott C Harris, San Diego, CA (US); Benjamin J Kwitek, Colorado Springs, CO (US)

( * ) Notice: Subject to any disclaimer, the term of this patent is extended or adjusted under 35 U.S.C. 154(b) by 0 days.

(21) Appl. No.: 18/767,711

(22) Filed: Jul. 9, 2024

(65) Prior Publication Data

US 2026/0015012 A1    Jan. 15, 2026

(51) Int. Cl.
*B60W 60/00* (2020.01)
(52) U.S. Cl.
CPC ..... *B60W 60/0015* (2020.02); *B60W 2554/80* (2020.02); *B60W 2555/20* (2020.02); *B60W 2555/60* (2020.02)
(58) Field of Classification Search
None
See application file for complete search history.

(56) References Cited

U.S. PATENT DOCUMENTS

| | | | | |
|---|---|---|---|---|
| 6,166,657 | A | * | 12/2000 | Mann .................... B60B 39/086 |
| | | | | 340/580 |
| 11,594,017 | B1 | * | 2/2023 | Gupta ................... G01S 15/931 |
| 2016/0379065 | A1 | * | 12/2016 | Hartmann .............. B60R 11/04 |
| | | | | 348/148 |
| 2017/0161572 | A1 | * | 6/2017 | Zhao ...................... G06V 10/25 |
| 2017/0241778 | A1 | * | 8/2017 | Hanatsuka ............... G08G 1/01 |
| 2018/0293448 | A1 | * | 10/2018 | Hartmann ............ B60W 40/06 |
| 2020/0114908 | A1 | * | 4/2020 | Lim ...................... G06V 20/588 |
| 2020/0160736 | A1 | * | 5/2020 | Moll ........................ G08G 5/21 |
| 2020/0406897 | A1 | * | 12/2020 | Hartmann ............. G06N 20/00 |
| 2022/0026898 | A1 | * | 1/2022 | Munte ................... B60R 16/023 |
| 2022/0281456 | A1 | * | 9/2022 | Giovanardi ........ G08G 1/09675 |
| 2022/0363260 | A1 | * | 11/2022 | Stenneth ............... B60W 10/02 |
| 2022/0379927 | A1 | * | 12/2022 | Wickes ................ G05D 1/0212 |
| 2023/0192036 | A1 | * | 6/2023 | Arunmozhi ........... B60S 1/0859 |
| | | | | 134/45 |
| 2023/0256972 | A1 | * | 8/2023 | Roy ...................... B60T 8/1725 |
| | | | | 73/146 |
| 2025/0333057 | A1 | * | 10/2025 | Satre ................... B60W 30/143 |
| 2025/0333064 | A1 | * | 10/2025 | Satre .................... B60W 40/06 |

FOREIGN PATENT DOCUMENTS

| | | | | | |
|---|---|---|---|---|---|
| DE | 4213221 | A | * | 10/1993 | |
| JP | 2004354193 | A | * | 12/2004 | |
| JP | 2021089331 | A | * | 6/2021 | |
| KR | 20110054824 | A | * | 5/2011 | .............. G01H 1/14 |

* cited by examiner

*Primary Examiner* — David P. Merlino
(74) *Attorney, Agent, or Firm* — Scott C Harris, Esq

(57) ABSTRACT

A autonomous driving vehicle and system. Vehicle sensors, including cameras and microphones, detecting conditions around the vehicle and producing signals indicative of the conditions around the vehicle that are detected that represent the way that liquid in the environment is reacting to the vehicle. A computer drives the vehicle. The computer receives information from the sensors about a current way in which liquid in the environment interacts with parts of the vehicle, under current roadway conditions and compares that to information in a database to determine a dangerous roadway condition.

16 Claims, 1 Drawing Sheet

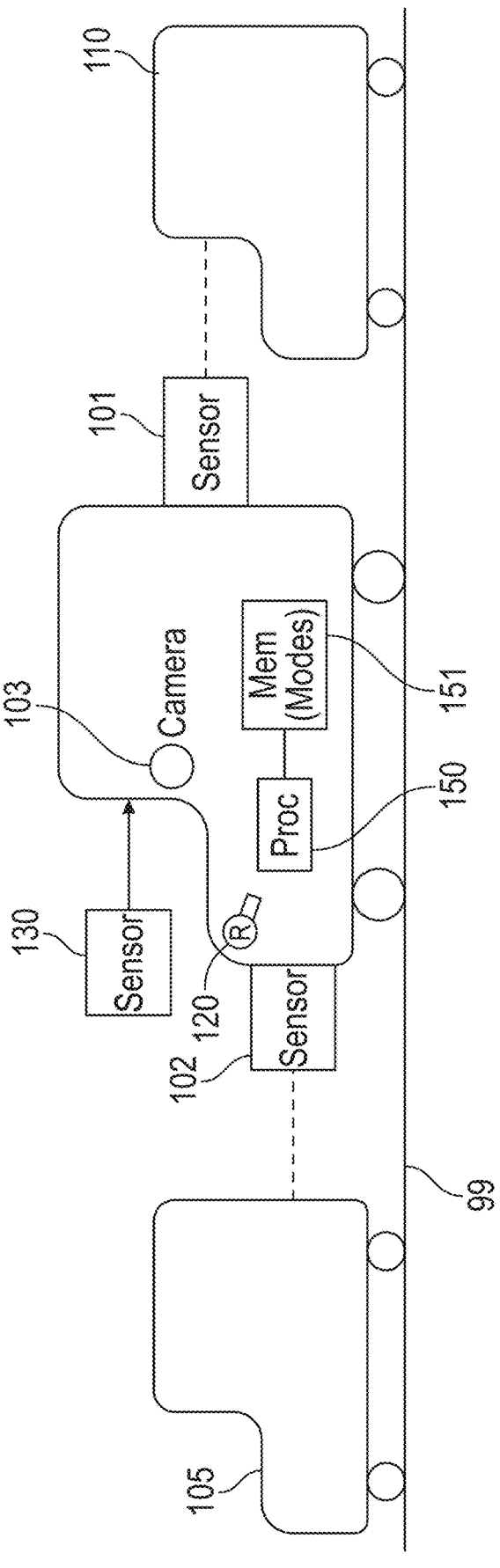

VEHICLE OPERATION MODIFICATION BASED ON WEATHER SENSING SENSORS

BACKGROUND

Autonomous Vehicles (AV or AVs) will continue to be developed and will ultimately replace many human-controlled vehicles. The technology of AVs continues to improve, and people will eventually become more comfortable with computer-controlled automobiles. Many of the current technologies continue to address route navigation, road and obstacle detection, traffic, traffic control devices and other factors involved with driving on public roads.

Throughout this application, AVs are referenced, which can include any kind of electronically assisted driving for cars, motorcycles, trucks or any other kind of vehicles. It should be noted that vehicles or Avs also include other forms of transportation on public roads including buses, trucks, motorcycles, all-terrain vehicles and other moving structures that utilize the roadway. It is also understood that AVs may refer to completely autonomous vehicles (no human driver assistance) or vehicles using semi-autonomous driving modes—including with the support of a human driver.

SUMMARY OF THE INVENTION

The inventors have recognized that there has not been a lot of development regarding weather and its impact on AVs.

Humans learn how to drive in many different weather situations. Almost every type of weather affects the vehicle. This includes sunshine, clouds, fog, rain, hail, ice, snow, lightning and wind. Often, these weather elements occur quickly and in unexpected combinations. For example, wind and snow might combine to create blizzard conditions on the roads.

Human drivers can be proactive and reactive to these changing driving conditions. People can watch the skies, look at other vehicles, and sense how their vehicle is behaving. These observations often lead to driver adjustments such as steering into the wind or slowing down when the traction is reduced on water, ice, or snow.

Driving on poor weather condition roads can lead to loss-of-traction or loss-of-control events such as skidding, sliding, uncontrolled movements, or rolling. These events often lead to accidents, injury, and death.

The present invention describes technologies, methods, and systems to help AVs drive more proactively to address changing weather conditions so that their occupants and cargo remain safe and secure.

In an embodiment, the sensors in an AV are used to monitor how liquid in the AV environment interacts with parts on one or more vehicles traveling the road. The specific interaction between the liquid on the road, and the vehicle part, is used to adjust a way in which the AV is piloted. Determination of bad weather conditions can change the mode of AV piloting to force more conservative driving, including greater follow distances, lower speeds, slower lane changes, and lower speeds on cornering.

The system as in an AV can detect the temperature, and hence they know if it is above or below freezing. However, weather conditions can be much more complicated than just whether the temperature above or below freezing. Even if below freezing, the roadway can be warmer because of traffic or residual heat from the sun. The road can be colder such as on a bridge. The roadway conditions are a complicated chaotic system, that cannot be easily determined from the air temperature.

The present application is based on the recognition that the actual roadway conditions cannot be determined accurately from simple measurement of air temperature, but ways to monitor the road conditions in inclement weather are described herein.

BRIEF DESCRIPTION OF THE DRAWINGS

In the Drawings:

the FIGURE shows aspects of the invention, and specifically:

FIG. 1 shows a block diagram of a vehicle on a road with surrounding vehicles, using the techniques described herein.

DETAILED DESCRIPTION

The present application describes a system for using a computer-based driving system in an Autonomous Vehicle, which can be any vehicle that uses a computer to carry out or assist with any part of the driving, referred to herein as an AV. Each of these are based on recognitions by the present inventors.

Embodiments monitor how precipitation products, e.g., liquid, slush, snow, ice, mud, and other forms of precipitation, in the vehicle environment interacts with one or more moving vehicles including the vehicle doing the monitoring, the AV, and other vehicles. This application refers to "liquid", to refer to the different forms of precipitation that can exist on roadways as they get colder, including water, slush, snow, ice, in its various forms, and mud. While this is referred to as liquid, it should be understood that this liquid may be in a solid or semi-solid form, even though that solid form will eventually melt to a liquid.

An embodiment uses a camera to view tire interaction with the precipitation product, e.g., liquid, slush, ice and snow, in the AV environment.

When a vehicle is driving through liquid precipitation, the tires disperse the standing water that is on the roadway. The water is effectively sprayed away from the tire as it makes contact. This cause a spray or stream of water and water-based solids to be noticeable behind each tire. When the temperatures drops and the water on the road begins to freeze into ice, this spray becomes less visible or disappears completely when cold enough.

An embodiment is shown in FIG. 1. An AV 100 is driving on a road 99 with other vehicles 105, 110, including vehicles in front of, behind, and to the side of the AV 100. The AV 100 has sensors, e.g., cameras 101, 102, 103 imaging in front of and behind the AV 100, as well as on sides of the AV. The cameras are used to detect road conditions to allow the autonomous driving done according to the present application. These sensors can also include radar, LiDAR, microphones, and other sensors.

In one embodiment, the sensors, here cameras, are used to monitor the wheels of vehicles traveling around the AV 100. These cameras capture images and videos of the wheels of the viewed vehicles, referred to herein as images, since a video can be conceptualized as a series of images taken over time.

A processor in the vehicle 100 analyzes these images.

In one embodiment, these images are analyzed to check for specified items of motion of precipitation product in the recorded frames. The specified items of motion are water droplets and displaced precipitation in one embodiment.

The processor has a memory 151 that stores a model of what different precipitation product looks like when coming off different vehicle tires in different roadway conditions. In general, the roadway conditions can be characterized as being:

Normal, either no precipitation, or otherwise good roadway conditions.

Difficult, roadway conditions in which some lack of traction is possible. This would be rain conditions where the water could affect traction.

Bad, for snowy or freezing or close to freezing conditions with water forming areas having lack of traction due to the freezing conditions.

Extremely dangerous, for roadway conditions that indicate a complete loss of traction may occur at any time such as ice, freezing rain, or black ice.

Of course, other or fewer roadway conditions can be determined, depending entirely on the amount of granularity of control of the AV desired.

The model has different images representing different ways in which the precipitation product comes off of vehicle parts in different roadway conditions. The model can be created by the manufacturer, based on analysis of images in different roadway conditions using information that is later acquired, e.g., you later know there was a black ice condition, so obtain photos of liquid interacting with tires for this time period for the model.

This can be a library of images showing liquid interacting with vehicle parts at different road conditions, including rainy, slushy, snowy and icy conditions, and using knowledge of road danger of the different items in the library that were obtained after the fact. The degree of dangerousness of the images of the roads can thus be correlated with the images in the database.

The model shows, for different road and weather conditions, the way that the water droplets in their different forms react in the images when interacting with the vehicle part. In one embodiment, this follows the motion of the water, testing the water's speed and trajectory coming off the vehicle part.

In one embodiment, the system compares the images with the images in the database and finds a match.

In another embodiment, the way that the liquid emits from the vehicle is modeled, and the model is applied to the current image/video.

An embodiment uses the vehicle part as a vehicle tire. The water in an embodiment is coming off the vehicle tires. The speed and trajectory of the water coming off the tire (as a function of the vehicle speed) is translated in one embodiment into information indicative of road conditions. In another embodiment, the image of the liquid coming off the tire is compared with the images in the database, and a closest match is found.

The water coming off the tires indicates the amount of slippage on the road, which depends on temperature, road condition, deicing, number of cars on the road, and numerous other conditions.

In another embodiment, water on the vehicle windshield can also be used to represent or to determine conditions of the precipitation. For example, solid bits of water coming off the vehicle windshield can mean that the precipitation is freezing rain. Small bits of snow can create icing or buildup.

Another embodiment uses multiple vehicle parts to determine information. The difference between the water coming off the windshield and the water coming off the tires can also provide information. If snow is falling, but the tires are showing liquid, then the deicing on the road is working, and while they still can represent a dangerous situation, it is less dangerous than the situation where snow is coming on the windshield and snow is coming off the tires. If rain is coming on the windshield, but there is no rain coming off the tires, this can represent a black ice situation.

The images are compared against the images in the database, and a closest match is found which represents the roadway condition. The match can use all of the matching techniques above, speed including speed and trajectory of water coming off the vehicle, whether solid bits of water coming off the different vehicle parts, and whether there is a trend of less water coming off the vehicle parts overtime indicating that the weather is getting colder and more of the water is icing.

Embodiments are described herein.

The AV 100 itself uses its computer 150 along with input from the sensors, to drive the vehicle. The vehicle is driven according to certain rules, the rules including at least all of following distance to other vehicles, distance needed to stop at a stop sign or traffic light or stopped vehicle, speed of rounding corners based on the severity of the corner, and maximum speed on the roadway, based on the specific characteristics of the roadway (including the speed limit of the roadway). A vehicle may also allow user to set the amount of aggressiveness of driving. For instance, Teslas allows setting multiple different driving aggressiveness modes, ranging from chill to aggressive.

When the AV detects a roadway condition which is other than "good", the AV automatically changes the mode of operation of the vehicle to a less aggressive driving mode. This includes at least increasing the following distance between the AV and any preceeding vehicles, and increasing the distance needed to stop. In addition, this may reduce the maximum speed on the roadway to a speed below the usual speed limit. This may also reduce the maximum speed of turning a specific corner based on the specific turning amount of that corner and similarly, reduce the speed at which lanes are changed.

This is done to avoid a potential crash from a potential loss of traction caused by precipitation induced roadway conditions.

In another embodiment the AV has sound detection equipment 120, e.g., microphones, to monitor the noises coming from the surrounding vehicles, e.g., the tires 99 of vehicle 98. The sound is compared against a database of sounds for various weather conditions. The database includes sounds of water leaving the tires at different precipitation conditions, for water, slush, snow or ice leaving the tires. Similarly, the sounds of this data are compared against other sources of data to make a determination about the road conditions.

in one embodiment, this can compare the amplitude of the sounds at different frequencies of the sound and compare that against the database to find the most similar. In one embodiment, this can look at the frequency distribution of the sounds. This can also use AI to compare the current sound against the model and try to find the most similar match.

If the AV detected sounds are indicative of slush, snow or ice, the vehicle's speed, aggressiveness and following distance is reduced to lower the chances of a potential loss of traction.

In an embodiment, AVs can use sensors 130 on the windshield and the windshield wipers to monitor weather and road conditions. When precipitation turns from rain to ice or snow, the windshield often begins to accumulate ice. The AVs sensors 130 could recognize this and make adjustments to help prevent a potential loss of traction. These sensors could include cameras, microphones, temperature, location/position of the wipers, radar, LiDAR, lasers or other measurement devices to monitor potential buildup on the vehicle caused by winter precipitation.

In an embodiment, AVs could use the cameras to monitor vehicles coming in the opposite direction. These images could show ice or snow buildup on the front of these vehicles. This would be an indication that more severe winter weather exists in the direction that the present EV is traveling. This data could also include the amount of motion in the antennae of incoming vehicles since snow or ice buildup causes these items to sway more dramatically given the weight that is attached to them.

In an embodiment, AVs can monitor the road in front of them with various sensors. These could include cameras, LiDAR, lasers, radar, and sound recording. The sensed conditions of the road could be compared to historical road recordings. This would indicate the potential presence of water, snow, ice or other items.

The techniques described herein may also allow the AV to monitor wind conditions. The vehicle can be equipped with sensors to record wind speed and direction. This data is analyzed using data about the vehicle to better compensate the steering angle of the vehicle and the corrections needed to straighten the vehicle due to sudden wind gusts.

Embodiments also allow for the AV to save all or some of this recorded data about images/video of other vehicle tires, and other parts, and upload those images to a database along with date and time. The images and videos in the database could then be analyzed further with advanced computational power and Artificial Intelligence (AI) to create new rules for safer AV driving. These images can also be updated with later-obtained information, giving the analysis the benefit of hindsight for their future review. In one embodiment, a detection of dangerous weather conditions can be noted by users or by any other way. For example, the dangerous weather condition can be black ice on a stretch of roadway, at a certain time. Later, images from that stretch of roadway are analyzed, using the hindsight knowledge that there was black ice on those roadway sections, to find characteristics of the images, including, the way that water or liquid falls off of surfaces of the vehicle. Seeing those kinds of characteristics in later images can be used as one indication that black ice conditions could exist, and using that to change the AV driving of the vehicle to a more conservative driving style, e.g., one intended to drive on black ice.

In addition, the collected data and results are shared with other AVs on the road in the same vicinity. This would give the vehicles more information about how the weather might be different in every direction.

The collected data from thousands or millions of AVs would generate knowledge that would help replace human judgement in driving vehicles. This knowledge could also inform new technologies and advancements for future AVs, road construction, traffic monitoring and control systems and other factors.

In an embodiment, the collected data could also be combined with third-party data to provide an even better situational awareness. This might include weather radar, government weather warnings, forecasts, and weather monitoring data from other stationary and moving sources.

In embodiments the collected data from the moving AVs could also be shared with third parties such as news stations and organizations (schools, government offices, companies, etc.) to provide for potential late starts for students or employees or entirely cancelled events.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An autonomous driving vehicle system comprising:

plural vehicle sensors, detecting conditions around a vehicle and producing signals indicative of the conditions around the vehicle that are detected;

a computer, operating for automated driving operation of the vehicle, using the signals from the plural vehicle sensors, the computer driving the vehicle according to rules, including at least rules for default amounts of maximum speed on a specific part of a road, follow distance to another vehicle and stopping distance of the vehicle;

the computer receiving information from the plural vehicle sensors about a current way in which liquid in an environment interacts with parts of the vehicle, under a current roadway condition;

a memory, storing information about ways in which liquid in the environment interacts with the parts of the vehicle under specified roadway conditions which were found in the past to be dangerous as a database in the memory;

the computer comparing the information from the plural vehicle sensors against the information in the database, where the parts of the vehicle include at least tires of the vehicle, and where the information from the plural vehicle sensors includes at least images of the tires of the vehicle, the computer analyzing said images to check for specified items of motion of water droplets in the images;

the computer analyzing including at least following a motion of droplets of water coming off the tires, and testing a speed and a trajectory of the droplets of water droplets coming off the tires, where the memory stores a model of what the water droplets look like when coming off different vehicle tires in different roadway conditions, and the computer comparing the motion of the water droplets, including the speed and trajectory of the water droplets coming off the tires, against the model of what water droplets look like when coming off different vehicle tires in the different roadway conditions to determine the current roadway condition; and the computer determining a dangerous road condition as the current roadway condition from the comparing, and upon determining the dangerous road condition, operating to operate the vehicle in a less aggressive automated driving, including at least all of reducing a speed of the vehicle on the specific part of the road, increasing a follow distance to another vehicle and increasing a stopping distance of the vehicle.

2. The autonomous driving vehicle system as in claim 1, wherein the plural vehicle sensors include at least a camera, the information from the plural vehicle sensors includes the images, and the images are compared with the information in the database to determine the dangerous road condition.

3. The autonomous driving vehicle system as in claim 2, wherein the parts of the vehicle include a windshield, and the system compares images of water coming off the windshield with the information in the database.

4. The autonomous driving vehicle system as in claim 1, wherein the plural vehicle sensors include at least sound detection sensors, the information from the plural vehicle sensors includes sounds of liquid in the environment interacting with at least one of the parts of the vehicle, and the sounds are compared with the information in the database by comparing an amplitude of the sounds at different frequencies of the sound against the information in the database to find a most similar frequency distribution of the sounds of liquid in the environment to determine the dangerous road condition.

5. The autonomous driving vehicle system as in claim 1, wherein the plural vehicle sensors include at least sound detection sensors, the information from the plural vehicle sensors includes sounds of liquid in the environment interacting with at least one of the parts of the vehicle, and the sounds are compared with sound information in the database to determine the dangerous road condition, wherein the sounds of liquid include sounds of windshield wipers on the vehicle interacting with the liquid in the environment.

6. The autonomous driving vehicle system as in claim 1, wherein the system detects information from water in the environment interacting with multiple different part of the vehicle, and compares the way the water reacts with one of the multiple different parts, with a way that the water reacts with another of the multiple different parts, and compares that to the information in the database, to determine the dangerous road condition and to operate in the less aggressive automated driving.

7. The autonomous driving vehicle system as in claim 6, wherein the system detects a difference between a way the water comes off a windshield of the vehicle and a way the water comes off the tires of the vehicle to detect the dangerous road condition and to operate in the less aggressive automated driving.

8. The autonomous driving vehicle system as in claim 1, wherein the rules also include a speed for turning operations, and the less aggressive automated driving reduces the speed for turning operations.

9. A method of autonomously driving a vehicle comprising:

using plural vehicle sensors, detecting conditions around the vehicle and producing signals indicative of the conditions around the vehicle that are detected;

using a computer, for automated driving operation of the vehicle, using the signals from the plural vehicle sensors, the computer driving the vehicle according to rules, including at least rules for default amounts of maximum speed on a specific part of a road, follow distance to another vehicle and stopping distance of the vehicle;

using the computer for receiving information from the plural vehicle sensors about a current way in which liquid in an environment interacts with parts of the vehicle, under a current roadway condition;

storing information about ways in which liquid in the environment interacts with the parts of the vehicle under specified roadway conditions which were found in the past to be dangerous, the storing being as a database in a memory;

using the computer for comparing the information from the plural vehicle sensors against the information in the database;

where the parts of the vehicle include at least tires of the vehicle, and where the information from the plural vehicle sensors includes at least images of the tires of the vehicle, using the computer for analyzing said images to check for specified items of motion of water droplets in the images;

the using the computer for analyzing including at least following a motion of droplets of water coming off the tires, and testing a speed and a trajectory of the water droplets coming off the tires, where the memory stores a model of what the water droplets look like when coming off different vehicle tires in different roadway conditions, using the computer for comparing the motion of the water droplets, including the speed and trajectory of the water droplets coming off the tires, against the model of what water droplets look like when coming off the different vehicle tires in the different roadway conditions to determine the current roadway condition; and using the computer for determining a dangerous road condition as the current roadway condition from the comparing, and upon determining the dangerous road condition, operating to operate the vehicle in a less aggressive automated driving, including at least all of reducing a speed of the vehicle on the specific part of the road, increasing a follow distance to another vehicle and increasing a stopping distance of the vehicle.

10. The method as in claim 9, wherein the plural vehicle sensors include at least a camera, the information from the plural vehicle sensors includes the images, and the images are compared with information in the database to determine the dangerous road condition.

11. The method as in claim 10, wherein the parts of the vehicle include a windshield, and the method compares images of liquid coming off the windshield with the information in the database.

12. The method as in claim 9, wherein the plural vehicle sensors include at least sound detection sensors, the information from the plural vehicle sensors includes sounds of liquid in the environment interacting with at least one of the parts of the vehicle, and the sounds of liquid are compared with the information in the database by comparing an amplitude of the sounds at different frequencies of the sounds and comparing against the database to find a most similar sound in the database by examining a frequency distribution of the sounds of liquid in the environment to determine the dangerous road condition.

13. The method as in claim 9, wherein the plural vehicle sensors include at least sound detection sensors, the information from the plural vehicle sensors includes sounds of liquid in the environment interacting with at least one of the parts of the vehicle, and the sounds are compared with sound information in the database to determine the dangerous road condition, wherein the sounds of liquid include a sound of windshield wipers on the vehicle interacting with the liquid in the environment.

14. The method as in claim 9, wherein the determining obtains information from water in the environment interacting with multiple different parts in the vehicle, and compares the way the water reacts with one of the multiple different parts, with a way that the water reacts with another of the multiple different parts, and compares that to information in the database, to determine the dangerous road condition and to operate in the less aggressive automated driving.

15. The method as in claim 14, wherein the determining detects differences with a way the water comes off a windshield of the vehicle and the way the water comes off the tires of the vehicle to detect the dangerous road condition and to operate in the less aggressive automated driving.

16. The method as in claim 9, wherein the rules also include a speed for turning operations, and the less aggressive automated driving reduces the speed for turning operations.

\* \* \* \* \*